Sept. 7, 1937.  G. WALL  2,092,661
ALTERNATING ELECTRIC CURRENT INDUCTION METER
Original Filed April 10, 1935
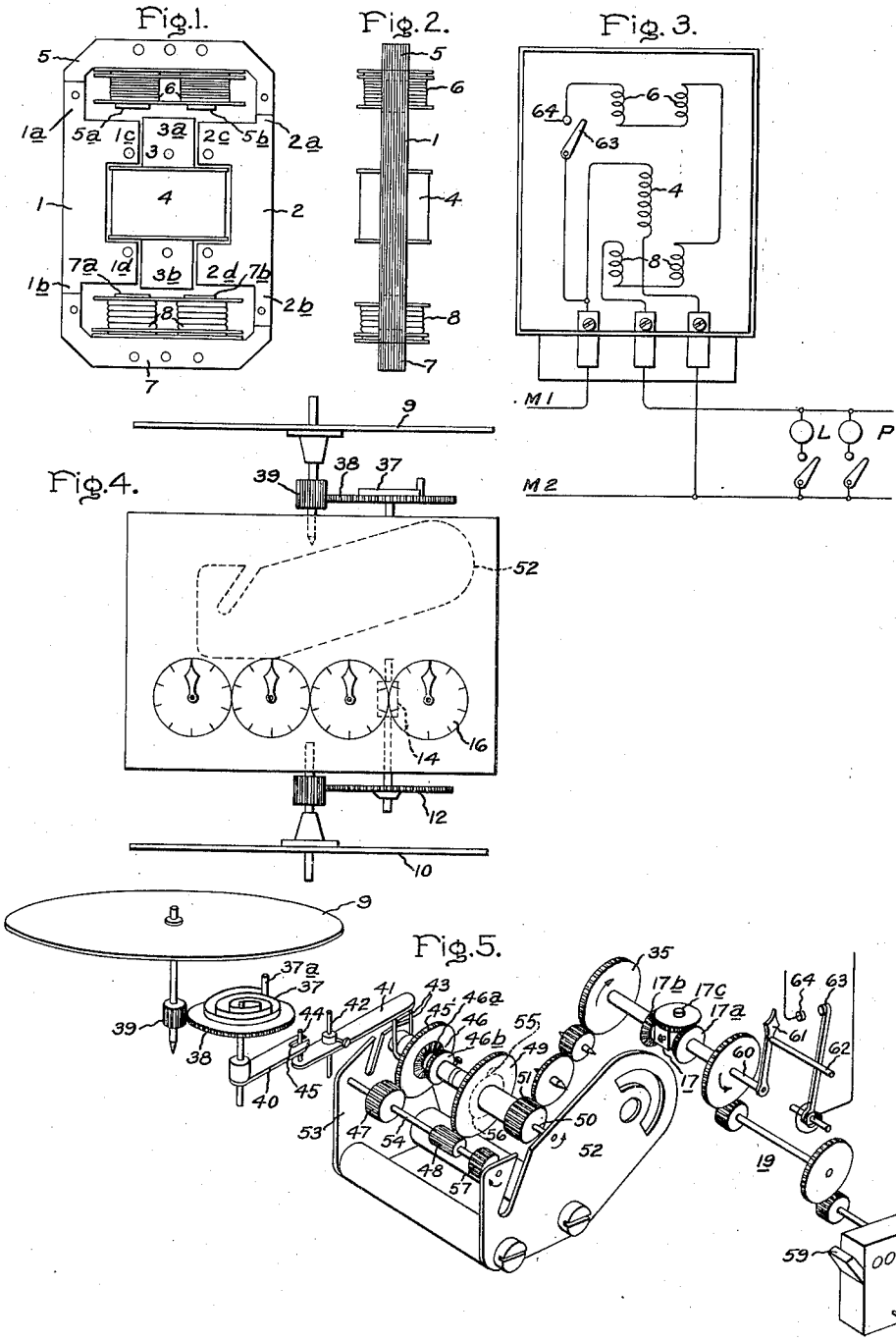
Inventor:
George Wall,
by Harry E. Dunham
His Attorney.

Patented Sept. 7, 1937

2,092,661

UNITED STATES PATENT OFFICE 2,092,661

ALTERNATING ELECTRIC CURRENT INDUCTION METER

George Wall, Manchester, England, assignor to General Electric Company, a corporation of New York Original application April 10, 1935, Serial No. 15,674. Divided and this application April 7, 1936, Serial No. 73,098. In Great Britain April 17, 1934

2 Claims. (Cl. 171—34)

This application is a division of my copending application, Serial No. 15,674, filed April 10, 1935, and assigned to the same assignee as the present application.

My invention relates to meters and integrating devices and concerns particularly electrical watt-hour meters, and alternating-current induction relays and instruments, which will be referred to inclusively as meters.

One of the objects of my invention is to provide an electrical device having two independent induction motor units with a single magnetic field structure, each motor unit including a series and a shunt electric magnetic system acting upon a rotatable element.

In watt meters for instance of this kind the magnetic fluxes of the series systems are produced by current windings in series with the load, the power taken by which it is desired to measure, while the magnetic fluxes of the shunt system are produced by voltage windings connected across the supply mains. Hitherto it has been usual to provide a separate voltage winding for each current winding or system, and it is an object of this invention to provide meters of the kind referred to having a simplified construction.

According to the present invention, in its preferred form, a single shunt winding common to both the electromagnetic systems is provided, the magnetic core of which is so shaped and arranged with respect to the magnetic cores of each of two current windings that the magnetic flux due to one pole of the shunt winding core combines with the magnetic flux due to one current winding to act upon one rotor element, and the flux due to the other pole of the shunt winding core combines with the flux due to the other current winding to act upon the other rotor element.

In one practical form of the invention the shunt winding is wound on a straight core located between the two cores of the current windings which are formed as pairs of projections from opposite sides of a rectangular magnetic system. This system provides a path for the shunt flux and other projections from the rectangular system cooperate with sides thereof to provide paths for the shunt magnetic flux. The two rotatable members of the induction motors are located in gaps between the ends of the shunt winding core and the ends of the current winding cores.

The invention will be better understood from the following description taken in conjunction with the accompanying drawing in which Fig. 1 is a front view of a meter motor element for a single phase meter, the meter rotors being omitted for clearness.

Fig. 2 is a side view of the meter motor element of Fig. 1.

Fig. 3 is a circuit diagram of the connections of the meter of Fig. 1.

Fig. 4 is a view of the registering mechanism driven by one of the meter rotors.

Fig. 5 is a perspective view of the change speed gearing.

Referring now to Figs. 1 and 2 of the drawing, the magnetic circuits of the current windings comprise two U-shaped members 1, 2 constructed of laminations, the yokes of which are provided with projections 1a, 1b, 2a, 2b, respectively, on either side. The limbs 1c, 1d and 2c, 2d of the two vertical members are located opposite to each other as shown and a straight central core 3 is located between the limbs as shown. The core 3 is supported by cross-pieces of non-magnetic material running from limb to limb and carries the voltage winding 4 wound thereon so that the said winding is located in the internal space formed by the four limbs 1c, 1d, 2c, 2d. The two upper projections 1a, 2a are connected by a U-shaped cross-piece 5, also laminated, and the limbs of which are interleaved with the projections 1a, 2a in the usual manner and secured thereto. The yoke of the cross-piece 5 is provided with two internal perpendicular straight cores 5a, 5b, on which are mounted in the usual manner two current coils 6 connected in series so as to form one current winding. A similar cross-piece 7 is provided to connect the two lower projections 1b, 2b and is likewise provided with two straight cores 7a, 7b on which are mounted the coils comprising the other current winding 8. The U-shaped cross-pieces 5 and 7 are so mounted that the ends of the perpendicular cores 5a, 5b, 7a, 7b are directed towards the respective end of the core 3 so as to leave an air gap of the desired width between the end of the central core 3 and the ends of the cores 5a, 5b or 7a, 7b. It will be seen that the limbs 1c and 1d, 2c and 2d form projections on the sides 1, 2 respectively of the rectangular frame 1, 5, 2, 7 and cooperate with the said sides 1, 2 to provide a path for the shunt magnetic flux.

In each of the gaps formed one of the rotor elements (not shown) of the meter is located in the well known manner. Then, the flux due to current flowing in the current winding 6 and that due to the upper pole 3a of the voltage winding core 3 are effective in causing rotation of the rotor element located in the upper air gap and the flux due to current flowing in the current winding 8 and that due to the lower pole 3b of the voltage winding core are effective in causing rotation of the rotor element located in the lower air gap.

Although the magnetic system of the current and shunt windings has been described hereinbefore as laminated, each lamination comprising four U-shaped members, other constructions are possible, as for instance a lamination comprising a single member, a stamping for example, having the same shape as the lamination of the assembled magnetic system comprising the four separate members. When a lamination is so constructed in one piece a number of lubricated joints are avoided in the final assembly of the system.

In Fig. 3 like references are used to indicate parts corresponding to those in Figs. 1 and 2. The supply mains are indicated at M1, M2 and it will be observed that the voltage coil 4 is connected across the mains. The lighting circuit is indicated at L and the load or power circuit at P.

Fig. 4 illustrates the application of the meter motor as hereinbefore described to an electricity meter for registering quarterly consumption of power and light for instance, in systems in which different rates are charged according to the rate of energy consumption. The rotor elements are indicated at 9 and 10, the rotor 9 being located in the air gap between the poles 5a, 5b and 3a (Fig. 1) and the rotor 10 in the air gap between the poles 7a, 7b and 3b (Fig. 1). The rotor element 10 is connected through a gear wheel 12 and worm 14 to its integrating or counting mechanism 16 in the usual manner or through change speed gearing. The rotor element 10 is furthermore provided with the usual brake magnet and adjusting devices for speed, inductive load and low load. These are omitted from the drawing for the sake of clearness. The rotor 9 controls a change speed gearing for varying the effect of the other rotor when the load rate changes.

Fig. 5 illustrates the application of the meter motor mechanism to the kind of prepayment meter known as the load rate prepayment meter in which the charge per unit is changed as soon as the instantaneous load or the integrated load demand exceeds a predetermined value. In meters of this kind one metering element only is necessary and one rotor may therefore be used as the actuating element of a relay responding to instantaneous power, average power load demand over time intervals of predetermined length, or some other quality depending upon the specific construction of the relay. In Fig. 5 the metering element is not shown as this is well known, but the rotor employed as a relay actuating element is shown as the upper one of the two rotors and is indicated by the reference 9. The metering element comprises the lower rotor (not shown) but the positions of the metering element and relay actuating element may obviously be interchanged. A change speed gear is interposed between the meter rotor and the consumption member of the prepayment meter differential, the change speed mechanism being operated by the relay when the consumption of the power or current exceeds a predetermined value to bring about a change in the velocity ratio of the change speed gear so that the ratio of the two velocity ratios is the same as the ratio of the price per unit charged for the consumption of power below the predetermined value to the price per unit charged for the consumption above the predetermined value.

In adapting the meter motor of the present invention to meters of this kind according to the specific embodiment illustrated in Fig. 5, the relay rotor, indicated at 9 is controlled by means of a spiral spring 37 so that it is only capable of turning through a limited angle against the force of this spring when acted upon by the current and voltage windings. The rotor 9 is geared to a wheel 38 by the wheel or pinion 39 secured to the rotor shaft, and on the shaft of the wheel 38 is secured the lever 40 of a lever system comprising levers 40, 41. One end of the spring 37 is fixed to a pin 37a secured to the wheel 38 and the other end of the spring is fixed to the shaft on which the wheel 38 is loosely mounted.

The lever 41 is pivoted on a pivot pin 42 mounted in suitable bearings and the lever is provided at one end with a fork member 43 comprising two depending pins. At the other end the lever 41 is provided with a pin 44 which engages in a slot 45 in the lever 40. The fork member 43 engages with the groove of a sleeve integral with one member in the form of a bevel wheel 46a of a dog clutch 46 and is adapted to slide on the shaft 50 which is mounted in two parallel plates 52, 53. A toothed wheel 45' is integral with the member 46a and meshes with another toothed wheel 47 which is secured to a shaft 54 mounted parallel to the shaft 50 in suitable bearings in the plates 52, 53. A pinion 48 secured to the shaft 54 meshes with a toothed wheel 49 loosely mounted on the shaft 50 and provided with a pawl 55 which engages with a ratchet wheel 56. This wheel 56 is secured to the shaft 50. The second member of the dog clutch also comprises a bevel gear wheel 46b and is secured to the shaft 50. The toothed wheel 51 is secured to the shaft 50 and is adapted to mesh with the commodity side of a meter differential 17. The shaft 54 carries a third wheel 57 secured thereto and adapted to mesh with the meter register which is operated in the usual way by the meter rotor. It will be observed that the change speed device hereinbefore described is inserted between the wheels 57 and 51, that is, between the meter rotor and the commodity side of the meter differential.

The prepayment mechanism constitutes no part of my invention and, therefore, is illustrated only schematically. Any suitable form of mechanism may be employed. The commodity side of such a mechanism is represented by a gear wheel 35 driving a sun wheel 17b of the differential 17. The coin side of such a mechanism is represented by the gears 19 driving the sun wheel 17a of the differential 17, and driven manually by a knob 18 through a coin box 58 containing suitable mechanism permitting the knob 18 to be rotated according to the number of coins of a given denomination deposited in the coin chute 59. A shaft 60 fastened to the planetary cage 17c carries a pointer 61 with a stop pin 62 and a movable contact 63 spring biased toward the pin 62 to cooperate with a stationary contact 64 and control the load circuit. Inasmuch as the pointer 61 rotates clockwise (viewed from the right of the drawing) under the influence of the meter rotor and counterclockwise under the influence of the coin knob 18, the position of the pointer indicates the number of coins deposited in advance payment and, when electricity consumption continues without any coins in advance payment, the pin 62 strikes the arm of the movable contact 63, opening contacts 63—64 and prevents the use of electricity until a coin has been deposited.

In the normal position of the change speed device, the clutch members 46a and 46b are out of engagement when the power consumed is below the predetermined amount.

The torque of the spring 37 is adjusted to a predetermined value which corresponds with the torque exerted on the rotor 9 by the current and voltage windings, when the predetermined value of current (and hence the power being consumed) flows through the current windings of the relay. At this value of the power, the torque exerted on the rotor 9 by the windings is able to overcome the torque exerted by the spring 37, and consequently the levers 40, 41 are operated and the member 46a of the dog clutch is brought into engagement with the member 46b.

When the power consumed is below the predetermined value the commodity side of the meter differential is driven through the wheels 57, 48, 49, ratchet wheel 56 and wheel 51, the dog clutch being in these circumstances disengaged. When the clutch is engaged as hereinbefore described the drive of the commodity side of the meter differential is through the wheels 57, 47, 45' and 51, since the clutch member 46b is secured to the shaft 50. The velocity of rotation of the ratchet wheel 56 is now greater than that of the wheel 49 so that the pawl 55 simply slides over the teeth of the wheel 56.

In order to prevent excessive forces acting on the relay rotor 9 due to high loads, which may result in straining of the lever system and clutch mechanism, the relay rotor may be suitably shaped to be cut only by a part of the magnetic flux due to the series and shunt windings.

It will be understood that in a meter of this kind the current windings acting on both rotor elements are connected in the same circuit.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A load rate meter comprising a common field structure and cooperating therewith a pair of rotor elements, current-conducting windings producing fluxes reacting with said rotor elements to produce torques therein dependent upon load, speed change gearing having a member movable to determine the speed ratio of the gearing, an integrated load responsive member, one of said rotor elements being free to rotate continuously and being connected to said integrated load responsive member through said speed change gearing, the other of said rotor elements being arranged to tend to drive the movable member of said speed change gearing from a position corresponding to one speed ratio to a position corresponding to another speed ratio, and means for preventing said motion until the load exceeds a predetermined value.

2. A load rate meter having a pair of rotor elements tending to rotate according to the rate of consumption of a metered quantity, change speed gearing having a movable speed control member, an integrated quantity responsive shaft, one of said rotor elements being free to rotate and being connected to said integrated quantity shaft through said change speed gearing, the other of said rotor elements being connected to said speed control member to change the speed ratio of the change speed gearing at a predetermined rate of consumption.

GEORGE WALL.